US008965544B2

(12) United States Patent
Ramsay

(10) Patent No.: US 8,965,544 B2
(45) Date of Patent: Feb. 24, 2015

(54) SYSTEMS AND METHODS FOR PROVIDING ZONE FUNCTIONALITY IN NETWORKED MEDIA SYSTEMS

(75) Inventor: Max Gordon Ramsay, New South Wales (AU)

(73) Assignee: Tymphany Hong Kong Limited, Sausalito, CA (US)

( * ) Notice: Subject to any disclaimer, the term of this patent is extended or adjusted under 35 U.S.C. 154(b) by 826 days.

(21) Appl. No.: 12/811,446

(22) PCT Filed: Jan. 7, 2009

(86) PCT No.: PCT/AU2009/000015
§ 371 (c)(1),
(2), (4) Date: Jul. 1, 2010

(87) PCT Pub. No.: WO2009/086597
PCT Pub. Date: Jul. 16, 2009

(65) Prior Publication Data
US 2010/0292818 A1    Nov. 18, 2010

(30) Foreign Application Priority Data
Jan. 7, 2008    (AU) ................................ 2008900061

(51) Int. Cl.
G06F 17/00    (2006.01)
H04R 27/00    (2006.01)
G06F 15/173    (2006.01)

(52) U.S. Cl.
CPC .......... *H04R 27/00* (2013.01); *H04R 2227/003* (2013.01); *H04R 2227/005* (2013.01); *H04R 2420/07* (2013.01)
USPC ........................................................... 700/94

(58) Field of Classification Search
CPC ........... G06F 3/16; G06F 3/162; G06F 3/165; G06F 3/167
See application file for complete search history.

(56) References Cited

U.S. PATENT DOCUMENTS 7,571,014 B1 *    8/2009    Lambourne et al. ............ 700/94
2005/0177256 A1 *    8/2005    Shintani et al. .................. 700/94
(Continued)

OTHER PUBLICATIONS

International Search Report—2 pgs. Feb. 5, 2009, Avega Systems PTY LTD.
(Continued)

*Primary Examiner* — Amal Zenati
*Assistant Examiner* — Thomas Maung
(74) *Attorney, Agent, or Firm* — Tarolli, Sundheim, Covell & Tummino LLP

(57) ABSTRACT

A Zone Control service is disclosed which provides for hierarchically managing a plurality of networked media subsystems. This can provide a layer of abstraction for the collection in the form of a single Renderer zone interface represented by a delegated zone controller. This hierarchy establishes a virtual super-system. Although a Zone Control services can be advertised on all networked media devices, the services will typically be unavailable while a device is subservient to, or equivalently under the control of, a zone controller. A single instance of the Zone Control service can reside in a Services Device, co-existing with a Group Control service.

20 Claims, 10 Drawing Sheets

(56) References Cited

U.S. PATENT DOCUMENTS

| | | |
|---|---|---|
| 2005/0232242 A1 | 10/2005 | Karaoguz et al. |
| 2005/0239396 A1* | 10/2005 | Kreifeldt et al. ............. 455/3.01 |
| 2007/0066316 A1 | 3/2007 | Hoover |
| 2007/0142022 A1 | 6/2007 | Madonna et al. |
| 2007/0160225 A1* | 7/2007 | Seydoux ........................ 381/79 |
| 2008/0025535 A1* | 1/2008 | Rajapakse ..................... 381/311 |

OTHER PUBLICATIONS http://www.digidescorp.com/products/Speaker/DDC_IP_Speaker.pdf, Archive: May 6, 2006.

* cited by examiner

SYSTEMS AND METHODS FOR PROVIDING ZONE FUNCTIONALITY IN NETWORKED MEDIA SYSTEMS

FIELD OF THE INVENTION

The present invention relates to systems and methods for providing zone functionality in networked media systems, and in particular to providing hierarchical control of one or more networked media systems.

Embodiments of the invention have been particularly developed to allow the configuration of a zone comprising one or more virtual devices, each virtual device being indicative of a networked media system, wherein a zone control interface can allow operational changes to be made across each of these networked media systems. While some embodiments will be described herein with particular reference to that application, it will be appreciated that the invention is not limited to such a field of use, and is applicable in broader contexts.

BACKGROUND

A networked speaker subsystem unit typically includes a central processing unit coupled to a memory unit, a networking interface and audio output hardware such as an amplifier and one or more speaker cones and/or an analogue audio output. The central processing unit provides a media rendering functionality whereby data indicative of audio received via the networking interface is processed to provide a corresponding audible output via the audio output hardware. In the case of a wireless speaker subsystem, the networking interface typically implements a wireless networking standard such as the IEEE 802.11 standard.

Often, there is preference to use a plurality of wireless speakers together to synchronously play back common audio. To this end, in some cases a plurality of wireless speaker subsystems are, as part of the manufacturing process, designated to be a wireless speaker set and in that way configured to act as a single wireless audio system. In other cases, wireless speaker subsystems are manufactured and sold individually with no specific pre-configuration to any particular set. A consumer purchases a plurality wireless speaker subsystems, and subsequently configures these wireless speaker subsystems to operate as a set.

Typically, an underlying rationale for arranging wireless speakers into a set stems from a common purpose, for example where the speakers are to define a surround sound system. However, it is envisaged that situations may arise where a more flexible approach is warranted, in that manner by which speakers are grouped may vary over time depending on purposes. For example, that set of surround speakers might not always be used for conventional home theater purposes. However, known approaches to implementing speaker group interoperation are too constrictive to take into account such variations in purpose.

SUMMARY

Described herein are devices, systems and methods relating to zone functionality across networked media systems and in particular to hierarchical control of one or more digital networked media systems in the form of wireless audio systems. However, although wireless audio systems are considered as a primary example, various embodiments are equally applicable to other audio systems, particularly other networked audio systems, and networked digital media playback systems generally.

One embodiment provides a method of providing zone functionality to media sub-devices, wherein a plurality of virtual media systems are each configured to control a respective one or more media sub-devices, wherein each virtual media system is discoverable and controllable thereby to collectively control its respective one or more media sub-devices, wherein the media sub-devices are connected to a common data network, the method including the steps of
  (i) discovering the virtual media systems;
  (ii) initiating formation of a zone including a selection of the virtual media systems;
  (iii) transmitting a single resource identifier for the zone to each of the selection of virtual media systems; and
  (iv) identifying a zone controller, wherein the zone controller provides a virtual zone super-system that is discoverable and controllable thereby to collectively control the respective one or more media sub-devices of the selection of virtual media systems.

One embodiment provides a method wherein the zone controller is selected from the one or more media sub-devices of the selection of virtual media systems.

One embodiment provides a method wherein the resource identifier is a Uniform Resource Identifier.

One embodiment provides a method wherein the virtual media super-system is identifiable on the basis of a Universally Unique Identifier.

One embodiment provides a method wherein each virtual media system maintains a zone profile for maintaining data indicative of all virtual media systems in the zone.

One embodiment provides a method wherein each media sub-device maintains a zone profile for maintaining data indicative of all media sub-devices in the zone.

One embodiment provides a method wherein a first media sub-device retains the zone profile for allowing the first media sub-device to rejoin the zone if temporarily removed from the zone.

One embodiment provides a method wherein a first media sub-device retains the zone profile for allowing the first media sub-device to rejoin the zone after temporarily operating under local control.

One embodiment provides a method wherein each media sub-device monitors a heartbeat signal transmitted across the data network for maintaining connectivity to the zone.

One embodiment provides a method wherein the virtual zone super-system is controllable using zone interface adapted to receive a first signal indicative of a zone function and communicate a second signal indicative of the zone function to the selection of virtual media systems.

One embodiment, provides a method wherein the virtual zone super-system is controllable using zone interface adapted to receive a first signal indicative of a zone function and communicate a second signal indicative of the zone function to the respective one or more media sub-devices of the selection of virtual media systems.

One embodiment provides a method wherein the first signal is indicative of a relative volume adjustment for the respective one or more media sub-devices of the selection of virtual media systems.

One embodiment provides a method wherein the zone controller is adapted to act as a network proxy for receiving media data and transmitting corresponding media data to each virtual media systems in the zone.

One embodiment provides a method wherein the zone controller is adapted to act as a network proxy for receiving media data and transmitting corresponding media data to each media sub-device.

One embodiment provides a method wherein steps (i) through (iv) are initiated by a control point.

One embodiment provides a method of providing zone functionality to media sub-devices, wherein a plurality of virtual media systems are each configured to control a respective one or more media sub-devices, wherein each virtual media system is discoverable and controllable thereby to collectively control its respective one or more media sub-devices, wherein the media sub-devices are connected to a common data network, the method including the steps of:

(i) presenting an interface indicative of a virtual media system,
(ii) initiating formation of a zone;
(iii) identifying a single resource identifier common to all selected virtual media system in a zone; and
(iv) presenting an zone interface indicative of a virtual super-system for receiving a signal indicative of a zone function thereby to collectively control the respective one or more media sub-devices of the selection of virtual media systems.

One embodiment provides a method wherein the virtual super-system is further adapted to receive a first signal indicative of a zone function provided to the zone interface and communicate a second signal indicative of the zone function to the respective one or more media sub-devices of the selection of virtual media systems.

One embodiment provides a method of providing zone functionality to media sub-devices, wherein a plurality of virtual media systems are each configured to control a respective one or more media sub-devices, wherein each virtual media system is discoverable and controllable thereby to collectively control its respective one or more media sub-devices, wherein the media sub-devices are connected to a common data network, the method including the steps of:

(i) discovering complimentary virtual media systems;
(ii) receiving a signal indicative of a Create Zone action;
(iii) performing a Create Zone action for establishing a zone that includes a selection of virtual media systems; and
(iv) presenting a zone interface for provides a virtual zone super-system that is discoverable and controllable thereby to collectively control the respective one or more media sub-devices of the selection of virtual media systems.

One embodiment provides a media playback apparatus including:
a networking interface for connecting to a data network; and a processor adapted to carry out a discovery process on the data network for allowing mutual discovery of complimentary virtual media systems; processor further adapted to advertise a zone interface; processor further adapted to receive a signal indicative of a Create Zone action from the network interface; processor further adapted to perform the Create Zone action for establishing a zone that includes a plurality of the virtual media systems.

One embodiment provides a media playback apparatus the processor is adapted to receive a first signal indicative of a zone function provided to the zone interface and communicate a second signal indicative of the zone function to the selection of virtual media systems.

One embodiment provides a media playback apparatus wherein the processor is adapted to receive a first signal indicative of a zone function provided to the zone interface and communicate a second signal indicative of the zone function to the respective one or more media sub-devices of the selection of virtual media systems.

One embodiment provides a media playback apparatus wherein the processor is adapted to act as a network proxy for receiving media data through the network interface and transmitting corresponding media data from the media interface to each virtual media systems included in the zone.

One embodiment provides a computer-readable carrier medium carrying a set of instructions that when executed by one or more processors cause the one or more processors to carry out a method of providing zoned functionality to media sub-devices as discussed herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Particular embodiments may provide all, some, or none of these aspects, features, or advantages. Particular embodiments may provide one or more other aspects, features, or advantages, one or more of which may be readily apparent to a person skilled in the art from the drawings, descriptions, and claims herein.

BRIEF DESCRIPTION OF THE DRAWINGS

A preferred embodiment of the invention will now be described, by way of example only, with reference to the accompanying drawings in which.

DETAILED DESCRIPTION OF EMBODIMENTS

Figure 1:
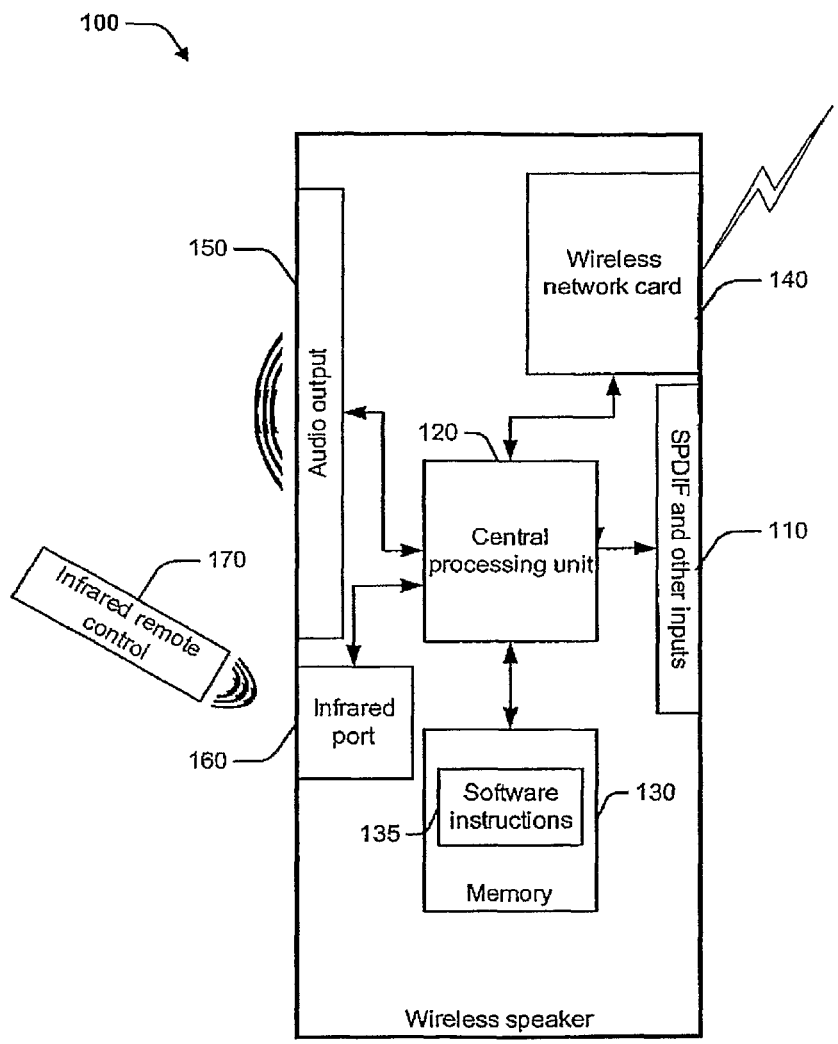
FIG. 1 shows an exemplary schematic for a wireless speaker subsystem.

Described herein are devices, systems and methods relating to zone functionality in networked media systems, and in particular to hierarchical control of one or more digital networked media subsystems in the form of wireless audio systems. However, although wireless audio systems are considered as a primary example, various embodiments are equally applicable to other audio systems, particularly other networked audio systems, and networked digital media playback systems generally.

In overview, by way of example only, a Zone Control service is disclosed which provides for hierarchically managing a plurality of networked media subsystems. This can provide a layer of abstraction by way of a single Renderer interface represented by a delegated zone controller. This hierarchy establishes a virtual super-system, also referred to as a "zone". Although a Zone Control service can be advertised on all networked media devices, the service will typically be unavailable while a device is subservient to, or equivalently under the control of, a zone controller. A single instance of the Zone Control service can reside in a Services Device (for example a media sub-device), co-existing with a Group Control service.

The term "controller" describes a leader/master device within a group or zone. The terms "controller", "leader" and "master" are in this manner generally synonymous.

In an embodiment, a UPnP Zone Control service is reliant on existing UPnP Media Renderer AV Transport service for the provision of "SetAVTransportURI". In this embodiment, individual groups are added to a zone by first entering a zone state by means of a custom defined Uniform Resource Identifier (URI). In this state, a designated zone controller can create a zone. A subservient group can be removed from a zone by any control point simply by invoking "Stop" and configuring a new URI with "SetAVTransportURI", ensuring that a control point can easily regain local control. It will be appreciated that "SetAVTransportURI" specifies a URI of a media resource to be controlled by an AVTransport instance. It will further be understood by those in the art that although specific exemplary embodiments describes use of UPnP, other network protocols may be used for providing Zone Control service within the scope of the present invention.

Reference throughout this specification to "group" defines a virtual collection of associable sub-devices that provide rendering functionality. This group can be equated to a virtual media system. For example this can represent a stereo or "X.Y" loudspeaker media system, where "X.Y" is a generic term used to refer to surround sound systems such as 5.1, 6.1, 7.1, 5.2 etc. A group is preferably persistent and typically associated with related networked sub-devices that are designed to operate together, for example a set of speakers.

Reference throughout this specification to a "zone" defines a collection of one or more groups (or equivalently virtual media systems), where each group receives the same media stream and provides synchronized rendering of that media stream. That is, whilst a "group" may be defined by a collection of individual wireless speaker units, a zone includes at least one predefined group, along with one or more other predefined groups of individual speakers. A zone is, in some cases, non-persistent and needs to be re-established by a control point after a device is power cycled. A zone is typically configured using a delegated zone controller. The zone, being a collection of one or more virtual media systems, provides a virtual super-system that is discoverable and controllable thereby to collectively control the respective one or more media sub-devices of the selection of virtual media systems. That is, a zone is controlled by way of a control interface provided by a virtual device representative of that zone, and that control interface allows commands provided to the zone to be implemented across the groups and/or individual media sub-devices that make up the zone.

FIG. 1 shows an exemplary wireless speaker subsystem 100. This wireless speaker subsystem is appropriate for use in the disclosed embodiments. This wireless speaker subsystem includes an input array 110 for receiving audio signals. Array 110 can includes a SPDIF input, along with various other standard and proprietary digital audio inputs. In some instances array 110 includes one or more analogue audio inputs, in which case wireless speaker subsystem 100 includes an analogue to digital converter for converting analogue audio signals into digital form. Once received (and where necessary digitized) the audio signals are processed by a processing unit, e.g., a central processing unit (CPU) 120, which operates in conjunction with memory 130. Memory 130 includes software instructions 135 that, among other functions, allow wireless speaker subsystem 100 to perform methods described herein. It is noted that not all instructions required for performing these methods need be in memory 130 at a given time.

Wireless speaker subsystem 100, given that it can present a interface for a virtual media system (or group), is optionally responsible for fetching media from a server, or in the case of an SPDIF stream, partially recovering that stream from a digital input. Data indicative of this media or stream is then distributed to the other devices in the group. CPU 120 is responsible for administering playback of a received audio signal. In a broad sense, this includes two distinct tasks:
  (i) Firstly, using a wireless network interface 140, providing instructions to other wireless speaker subsystems to play respective components of the audio signal.
  (ii) Secondly, using an audio output 150 (which in some embodiments includes one or more speaker cones), playing back component of the audio signal intended for that speaker subsystem (for example based on the speaker's position within a surround sound arrangement).

Wireless speaker subsystem 100 also includes an infrared port 160. This infrared port receives infrared control signals from a compatible infrared remote controller 170. Where wireless speaker subsystem 100 acts as an individual wireless speaker subsystem, such a signal is a device control signal. However, when wireless speaker subsystem 100 is part of a wireless audio system, such a signal is recognized as a system control signal. It would be appreciated that when a wireless speaker subsystem 100 is configured as a group controller, a system control signal received by infrared port 160 can be provided by a TCP message to other members of the associated group. In other embodiments alternate remote controls are used, such as Bluetooth remotes, 802.11 type networked remotes, and radio frequency remotes. In other embodiments a control signal received by infrared port 160 is provided to the group by means other than TCP message—for example by a layer two encapsulated message or other proprietary message.

It will be appreciated that subsystems can include, by way of example only, a wireless speaker subsystem, a audio source subsystem, video display subsystem, a video source subsystem and another media renderer.

It would also be appreciated that although the above embodiments have been described by reference to wireless networking, in some embodiments alternate networking arrangements are used such as wire-based Ethernet networks and power line networks. It will be appreciated that embodiments of the invention described by reference to wireless networking are equally applicable to these other networking arrangements.

Figure 2:
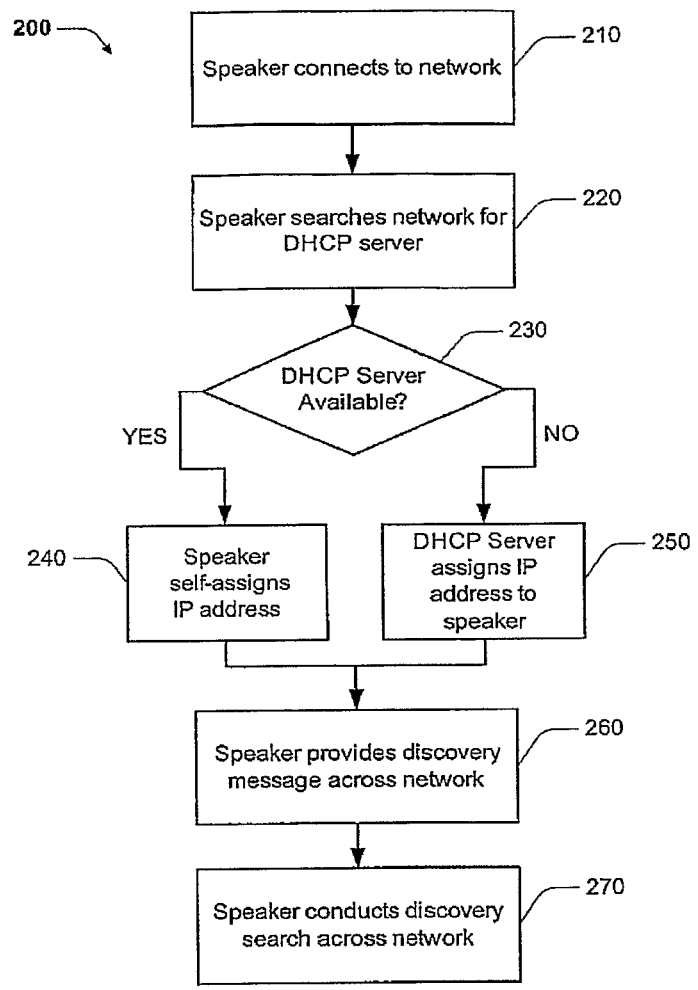
FIG. 2 shows an exemplary method for implementing a discovery process of a media subsystem.

FIG. 2 shows an exemplary flowchart 200 for implementing a discovery process of a media subsystem, with reference to the wireless speaker subsystem 100. It will be appreciated that this is provided as an example only, and in other embodiments other discovery processes are used.

In this example, a wireless speaker subsystem can connects to a network 210 and implements a Dynamic Host Configuration Protocol (DHCP) client, which searches for a DHCP server 220. A DHCP server is typically responsible for the assignment of IP addresses across a network. If, at decision 230, no DHCP server is available, the wireless speaker subsystem self-assigns an IP address at step 240. Otherwise, an available DHCP server assigns an IP address to wireless speaker subsystem at step 250. In either case, the IP address assigned is used by wireless speaker subsystem in subsequent network operations. Once an IP address is assigned, the wireless speaker subsystem can advertise itself across network at step 260. In particular, wireless speaker subsystem can provide a discovery message that communicates to other wireless speaker subsystems and other devices on network a relatively small data packet indicative of wireless speaker subsystem. For example: data indicative of a type or identifier, and a URL indicative of a location from which more detailed information is available. In the present embodiment the data packet includes the wireless speaker subsystem's MAC address. Step 270 includes conducting a discovery search across network for devices of interest—such as other wireless speaker subsystems or groups representative of wireless audio systems. The discovery search includes the provision of a probe frame, and in response to this probe frame a similar discovery message to that mentioned above is provided by each complementarily discoverable device on network to wireless speaker subsystem. This includes wireless speaker subsystems.

It will be appreciated that, following this discovery process, each wireless speaker subsystem discovers the other wireless speaker subsystems regardless of the order in which the wireless speaker subsystems connect to network. For instance, the first wireless speaker subsystem to connect discovers the other wireless speaker subsystems as they connect and advertise themselves. The last wireless speaker subsystem to connect discovers the other wireless speaker subsystems following a discovery search.

Although the present embodiment is described by reference to the use of IP addresses, that should not be regarded as limiting. For example, in one embodiment layer two encapsulated packets are used, optionally in conjunction with a proprietary discovery protocol adapted to make use of such packets. In one such embodiment only MAC layer access is required, as opposed to higher layer access such as IP layer access.

It would be appreciated that there are a number of known discovery protocols that manage precisely how discovery takes place. In various embodiments of this invention discovery protocols such as Universal Plug and Play (UPnP) Bonjour and Jini are used, as well as proprietary discovery protocols. Bonjour is a general method to discover services on a local area network, and was formerly called Rendezvous. It is Apple's trade name for its implementation of the Zeroconf specification framework. For Jini, see www.jini.org.

Figure 3:
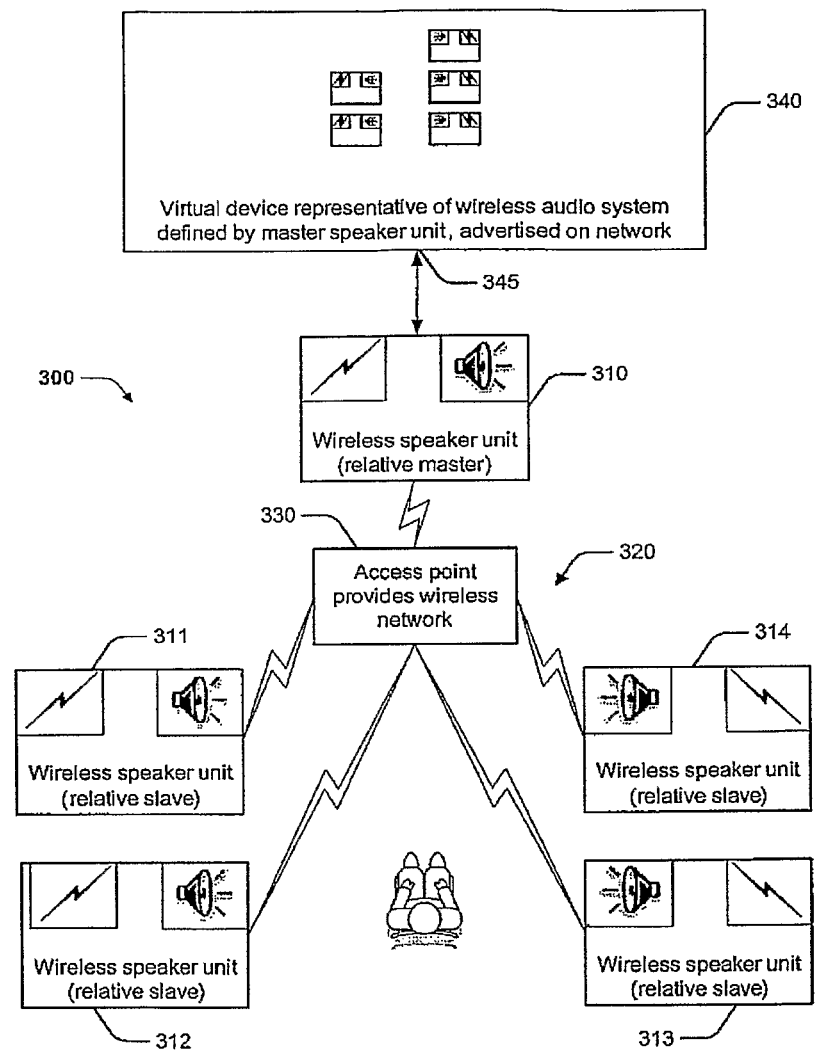
FIG. 3 shows an exemplary schematic for a wireless audio system including five wireless speaker subsystems.

FIG. 3 shows an exemplary embodiment for a wireless audio system 300 including five wireless speaker subsystems 310 to 314. These wireless speaker subsystems are activated and automatically connect to a wireless network 320. An open access point 330 provides access to this network. By connecting to the network each of the wireless speaker subsystems are operatively associated with the access point 330. The access point is "open" in the sense that wireless speaker subsystems 310 to 314 are able to associate without the need to grant special permissions. In some embodiments such permissions are required. It would be appreciated that these speakers can autonomously arrange themselves to provide a wireless audio system such as system 300. In some embodiments the wireless speaker subsystems first associate to an open access point, and subsequently self arrange themselves into an internal private network.

A group 340 can be defined to provide a virtual wireless audio system that includes wireless speaker subsystems 310 to 314. This virtual media device is representative of wireless audio system 300. A system control interface 345 is provided to access group 340, which receives system control signals for implementing operations changes across the system 300. Group 340 describes a discoverable group on network 320 that provides a capability in the form of a wireless audio system. System 300 describes the hardware making up the wireless audio system—including individual wireless speaker subsystems 310 to 314. Each wireless speaker subsystem is uniquely identifiable electronically by one or more respective identifying features, such as unique MAC addresses. In other embodiments several different makes of wireless speaker subsystem are used.

Although this group 340 is shown as being separate from the controller wireless speaker subsystem, it will be appreciated that in a practical sense the group can exist within, and shares the hardware of, the controller wireless speaker subsystem. Whilst messages are sent directly to the group, in a physical sense those messages are received by the network interface of the controller wireless speaker subsystem. This network interface may be a physical device such as a network interface, or alternately a logical interface.

Figure 4:
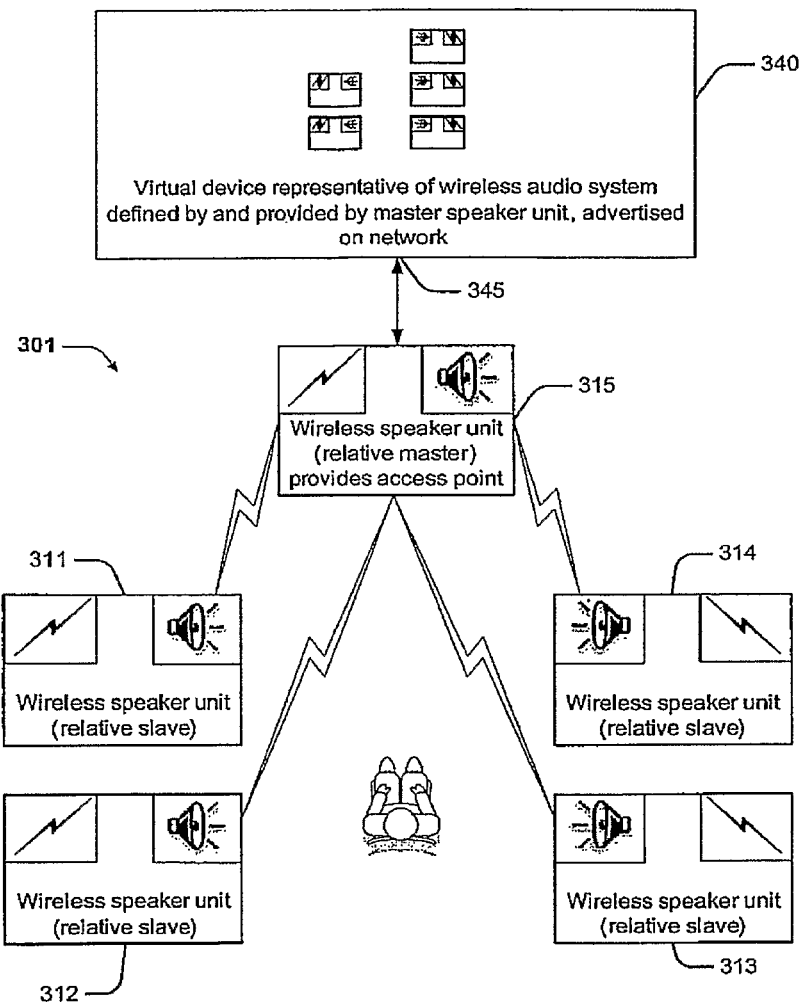
FIG. 4 shows an exemplary schematic for a wireless audio system similar to FIG. 3, but having a wireless speaker subsystem configured as an access point.

It would be appreciated that in some instances no access point is provided, and one of the wireless speaker subsystems inherently provides an access point. Referring to FIG. 4, an exemplary wireless audio system 301 similar to FIG. 3, but shows a wireless speaker subsystem 315 configured as an access point. In this embodiment each wireless speaker subsystem 311 to 315 scans for an available access point for a predetermined period of time, and if no beacon or probe response frames are received, establishes itself as an open access point (in this example wireless speaker subsystem 315). For example each wireless speaker subsystem can scan for a period of time related to the final byte in its MAC address—in some embodiments between about five to ten seconds multiplied by the value of that final byte. If no access point is found within that time, the wireless speaker subsystem initiates its own open access point. It will be appreciated that by such an approach only one of the wireless speaker subsystems need initiate an access point, and the remaining wireless speaker subsystems will associate to that access point. In one embodiment the wireless speaker subsystem providing the access point becomes the controller device.

Figure 5:
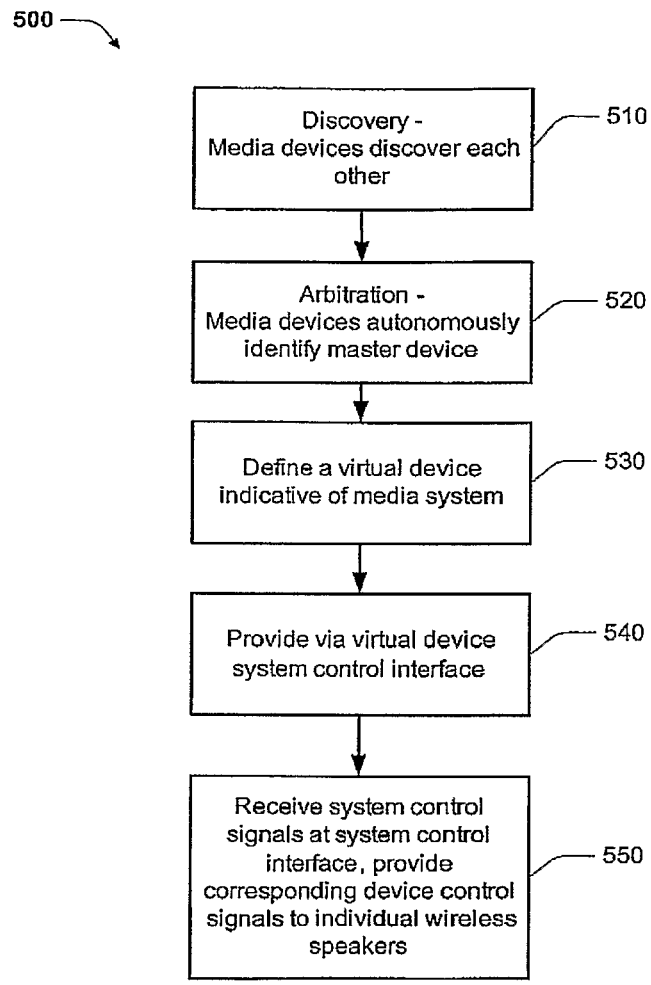
FIG. 5 shows an exemplary method for establishing a group.

FIG. 5 shows an exemplary flowchart 500 for establish a group. Once activated, wireless speaker subsystems undergo a discovery process as shown in FIG. 2. The flowchart of FIG. 5 is described by reference to a number of sub-processes. It will be appreciated that in various embodiments these sub-processes are performed in parallel or series. Sub-process ordering and particular examples should not be regarded as limiting.

Sub-process 510 represents a discovery sub-process as previously described with reference to FIG. 2, where the wireless speaker subsystems are discovered by one another and by other devices on the network. In practical terms, discovery is a process whereby networked devices—including the wireless speaker subsystems and other devices—share data indicative of their respective capabilities. For example, a wireless speaker subsystem advertises capabilities including wireless audio playback.

Sub-process 520 involves an arbitration step, where wireless speaker subsystems decides whether an existing device having a wireless audio system capability has been discovered. For example, whether an existing group has been discovered. If one has been discovered, wireless speaker subsystem determines that it is not the controller and provides a message indicative of its willingness to participate in the existing group interface.

Sub-process 530 a virtual media device is defined, which presents a single proxy interface to a collection of networked media devices to allow for a single control interface to these devices. Furthermore, a virtual media device is a networked device that does not have a conventional hardware manifestation. This virtual device is referred to as a "group" because it represents a plurality of networked media sub-devices (the wireless audio system).

Sub-process 540 a system control interface is provided via the group for receiving a system control signal indicative of an operational change to the wireless audio system. In particular, a signal or message provided to the group (for example by using the IP address of that device) is received by the system control interface. The term "operational change" should be read broadly to include substantially any change in state of any device either physical or virtual. For example: in the present context operational changes might include wireless speaker subsystem volume adjustment, other audio amplification settings, media playback control, and so on. Providing the system control interface in some embodiments includes advertising on the network the group—for example in accordance with one or more open or other proprietary networking protocols. The group advertises the capability of a wireless audio system, and this capability is discoverable and controllable on the network. A user wishing to apply an operational change across the wireless audio system—such as a volume adjustment—provides a system control signal indicative of this change to the group.

Sub-process 550 allows a system control signal to be received. In response to the system control signal, corresponding device control signals are provided to each of the wireless speaker subsystems to implement the operational change across the wireless audio system. The term "system control signal" refers to a signal, message or data packet that is directed to the group for applying an operational change across the wireless audio system. A device control signal is a signal, message or data packet that is directed to an individual wireless speaker subsystem for applying an operational change to that particular wireless speaker subsystem. In some embodiments a single device control signal is concurrently provided to a plurality of individual wireless speaker subsystems, such as by way of message broadcast.

In the present embodiment, one of the wireless speaker subsystems is responsible for implementing sub-processes 530, 540 and 550. That is, one of the wireless speaker subsystems defines the group representative of the wireless audio system, provides the system control interface, and is responsive to system control signals for implementing the desired operational changes across the system. Achieving this includes the step of identifying among the wireless speaker subsystems a wireless speaker subsystem, also called a controller wireless speaker subsystem. More specifically, in the present embodiment each speaker subsystem autonomously decides whether it is to be the controller speaker subsystem based on a predefined comparison protocol. In one embodiment this is performed on the basis that all speaker subsystems on the network are aware of each other. Various comparison protocols are used among embodiments. For example, in some embodiments each speaker subsystem includes a unique hierarchical identifier, and periodically broadcasts this identifier for reception by other speaker subsystems. In this way each speaker subsystem is able to compile a list of speaker subsystems on the network and their corresponding hierarchical identifiers, and as such make an autonomous decision as to whether or not it is to become the controller. Some further comparison protocols used in other embodiments are discussed further below. Wireless speaker subsystems that do not determine that they are controller wireless speaker subsystems inherently become slave wireless speaker subsystems. As new wireless speaker subsystems connect to or otherwise appear on the network they scan the network for existing devices, and under certain conditions join existing wireless audio systems.

Once groups are established for providing a virtual media system (e.g. a virtual wireless audio system) that includes the wireless speaker subsystems, each virtual grouped device has a system control interface to provide access the group and receive system control signals for implementing operational changes across the system.

Figure 6:
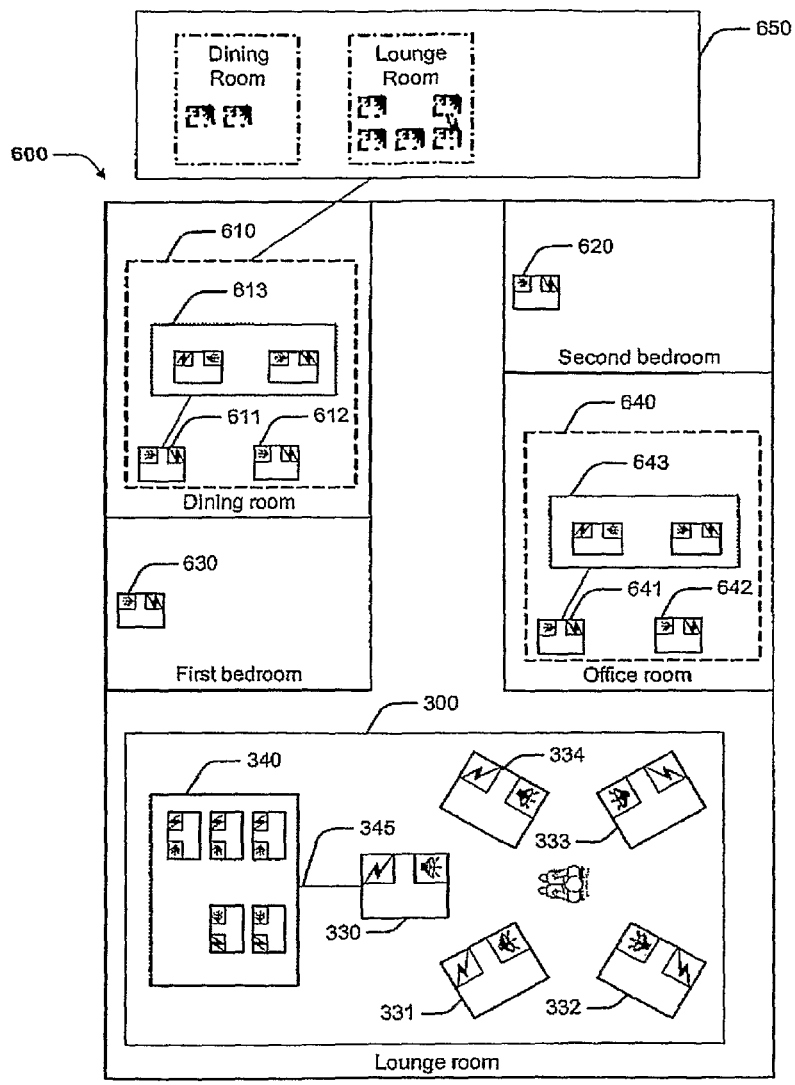
FIG. 6 shows an exemplary schematic of groups and zones defined in a typical use scenario.

FIG. 6 shows an exemplary schematic of groups defined in a typical use scenario. In this arrangement a group 300, as described earlier with reference to FIG. 3, is established in a lounge room. Another group 610, comprising subsystems 611 and 612, is presented as a virtual media system 613. Similarly, another group 640, comprising subsystems 641 and 642, is presented as a virtual media system 643. In this example a zone interface 650 is established to include the groups (or equivalently virtual media devices) 610 and 300, which in this example is provided by the zone controller 610. The collection of one or more virtual media systems establishes a virtual super-system that is discoverable and controllable thereby to collectively control the respective one or more media sub-devices of the selection of virtual media systems.

Where multiple systems exist on a common network, the groups representative of these systems can be controlled in a uniform manner by establishing of a zone control interface for allowing operational changes across each zone-associated networked media system (or group). Embodiments of the invention have been particularly developed to allow configuration of a zone comprising one or more virtual media systems, each virtual media system including a plurality of discrete distributed networked playback devices (such as wireless speakers).

Figure 7:
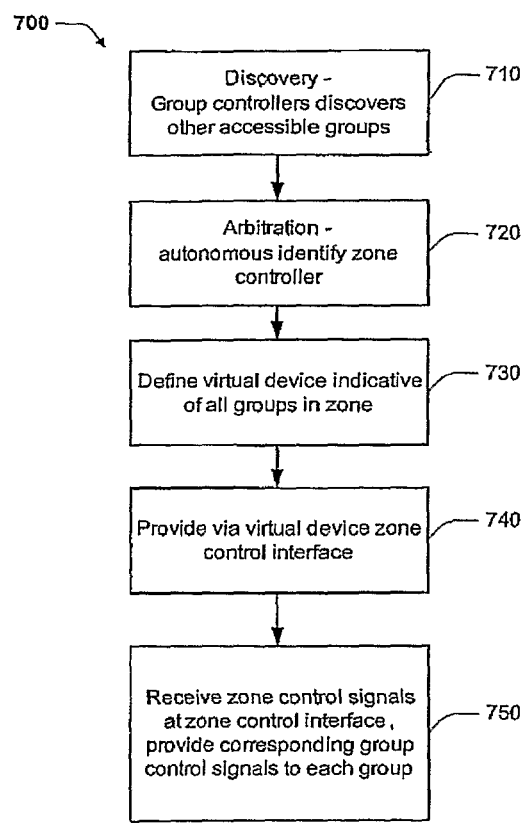
FIG. 7 shows an exemplary method for establishing a zone.

FIG. 7 shows an exemplary flowchart 700 for establishing a zone, which is described by reference to a number of sub-processes. It will be appreciated that in various embodiments these sub-processes are performed in parallel or series. Sub-process ordering and particular examples should not be regarded as limiting.

Sub-process 710 represents a discovery sub-process where groups are discovered by one another and by other devices on the network. In practical terms, discovery is a process whereby virtual groups—e.g. virtual media systems including media subsystems and other devices—share data indicative of their respective capabilities.

Sub-process 720 involves an arbitration step to establish a zone controller, where a group decides whether existing groups have been discovered. For example, whether an existing zone has been discovered. If a zone has been discovered, a virtual group device determines that it is not the controller and provides a message indicative of its willingness to participate the existing zone interface. In an embodiment a zone controller may be pre-assigned.

A virtual zone device is defined at sub-process 730, which presents a single proxy interface for collective discovery and control of a collection of a plurality of groups to allow for a single control interface that collectively acts for all of the individual devices within those groups. Furthermore, this virtual zone device is a networked device that does not have a conventional hardware manifestation.

In an embodiment a virtual device can have its own IP address. In other embodiments however a virtual device does not have IP addresses, for example as a result of a lower-level protocol running atop that virtual device. In some embodiments a virtual device includes one or more virtual sub-devices, and the virtual device has an IP address whilst the virtual sub-devices may or may not have respective IP addresses.

At sub-process 740 a zone control interface is provided via the zone controller for receiving a zone control signal indicative of an operational change that is to be applied across the groups making up that zone. In particular, a signal or message provided to the zone controller (for example by using the IP address of that device, or an IP address for a virtual device embedded on the zone controller) is received by the zone control interface.

The term "operational change" should be read broadly to include substantially any change in state of any device either physical or virtual. For example: in the present context operational changes might include zone wide volume adjustment, other audio amplification settings, media playback control, and so on. Providing a zone control interface in some embodiments includes advertising on the network the group—for example in accordance with one or more open or other proprietary networking protocols. The zone advertises the capability of groups, and this capability is discoverable and controllable on the network. A user wishing to apply an operational change across the zone (i.e. across all groups and sub-devices making up that zone), such as a volume adjustment, provides a zone control signal indicative of this change to the zone controller.

Sub-process 750 includes receiving a zone control signal. In response to the zone control signal, corresponding device control signals are provided to each of the group controllers to implement the operational change across the groups (and therefore the relevant individual sub-devices). The term "zone control signal" refers to a signal, message or data packet that is directed to the zone control interface for applying an operational change across the zone as a whole. In some embodiments a single group control signal is concurrently provided to a plurality of groups (i.e. to the respective control interfaces for those groups), such as by way of message broadcast.

In the present embodiment, a sub-device belonging to one of the groups is responsible for implementing sub-processes 730, 740 and 750, optionally being a group controller. That is, one sub-device configures the zone, provides the zone control interface, and is responsive to zone control signals for implementing the desired operational changes across the associated groups.

Once a zone is configured that includes the desired groups, that zone has a singe zone control interface to provide access to the zone and receive zone control signals for implementing operational changes across the zone as a whole. This zone control interface is provided via a virtual device representative of the zone, that virtual device being provided by hardware components of a given one of the individual media devices.

Figure 8:
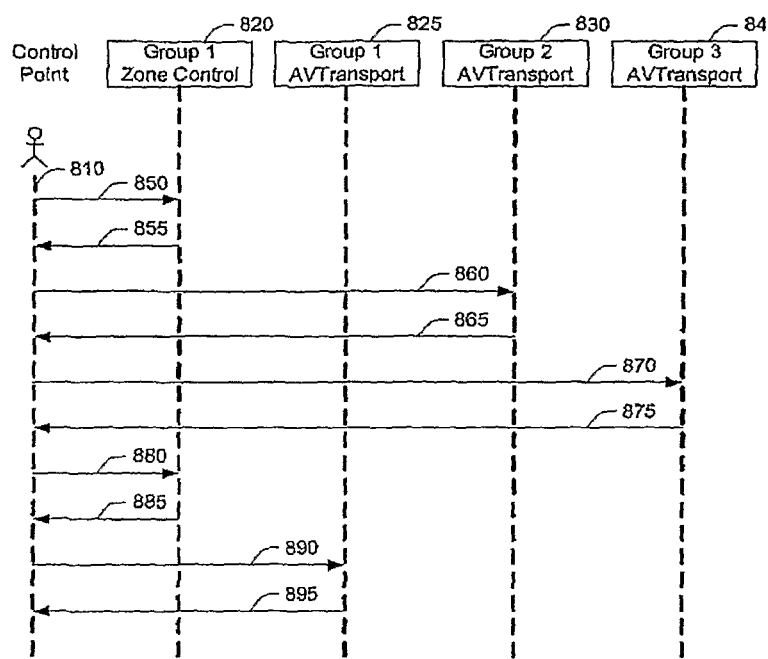
FIG. 8 shows an exemplary data flow diagram for establishing a zone.

FIG. 8 shows an exemplary data flow diagram for establishing a zone. A zone controller is identified, in this example "Group 1—zone controller". In an embodiment each. virtual media system (i.e. group) can include a unique hierarchical identifier, and periodically broadcasts this identifier for reception by other group controllers. In this way each group controller is able to compile a list of other groups on the network and their corresponding hierarchical identifiers, and as such make an autonomous decision as to whether or not it is to become a zone controller. Group controllers that are not zone controllers can inherently become a slave group controller within a zone (i.e. they are controller for their own group, but slave to the zone controller).

Referring to FIG. 8, by way of example only, a control point 810 issues a "TestZoneConnectivity" method, which allows the control point to establish whether a zone can actually be established and gives and indication of what media support may be available. Arguments to this method includes a "ZoneIPList", which lists the groups the control point proposes to include in the zone. Depending on the network topology, the media device performing the method can suggest a zone controller and which groups might be available for zone rendering in a returned "SupportedGroupList". Depending on the available network link rates and the suggested zone controller a returned "SupportedMediaType" gives an indication of the type of media that may be supported across the zone. The control point should be aware that any assessment can be subject to external influences such as users associated with the third party access point. The control point should make use of this information when creating the zone and be aware that the zone creation may need to be done on a device different to the one initially requested. It would be appreciated that, as this is a synchronous action, the response data is only as reliable as the information available to the device at time of invoking this method directly. Where a control point is displaying groups available for zone rendering, in some cases this action is periodically polled.

Creating a zone is a two-stage process. It is preferable that a control point first verifies individual group status before attempting to instantiate a zone, as groups participating in other zones will not join the new zone. Subservient groups must first be placed in zone mode by invoking a "SetAVTransportURI" method (e.g. 860, and 870) using a unique zone Uniform Resource Identifier (URI).

A "CreateZone" action 880 is initiated by a control point at a zone controller to create a zone. The control point passes a list of the IP addresses of the groups required to participate in the zone. From this point Group 1 is the zone controller, the slave groups will update their transport state variables to align with the lead group. This means that any control point can subscribe to LastChange eventing and receive correct information about rendering. A Universally Unique Identifier (UUID) will be returned which the control point can use as a handle to access the zone. As this action can take some time to complete, it is preferable that the control point should monitor the ZoneStatus and ZoneMemberStatusList state variables via the last change mechanism to determine if the creation of the zone is successful. It would be appreciated that all the usual transport actions 890—and associated responses 895—are available, the control point does not directly interact with the slave groups within the zone.

In this embodiment, the lead group must not already be participating in a zone. All renderers within the zone (including the controller) is preferably stopped and zoned state before invocation. Slave groups can only participate in a single zone, and zones cannot be nested so An "AddMemberToZone" action allows a control point to add new members to an existing zone. This is a two stage process as with initial zone creation. The subservient group must first be placed in zone mode by invoking "SetAVTransportURI" method with the unique zone URI. The control point preferably verifies the subservient group status before calling the GetZoneStatus action so ensuring that the device has successfully entered zone mode. Where this action can take some time to complete the control point should monitor the "ZoneMemberStatusList" state variable via the last change mechanism to determine if the addition of the group to the zone is successful. It would be appreciated that while it is possible to add groups to the zone on the fly while rendering across the zone, it is preferred that the zone be placed in stop state before adding groups.

A "RemoveMemberFromZone" action can explicitly remove a nominated group from the zone. A nominated group can be removed from a zone by any control point by invoking "Stop" and configuring a new URI with a SetAVTransportURI method. This ensures a control point can easily gain (or regain) local control. This action however provides a clean method to manage a zone centrally.

It would be appreciated that be providing a zone that has a plurality of groups enables more complex hierarchical control to be achieved. A more course control can be achieved by controlling all groups within a zone, while more specific control can be achieved by controlling a single group of devices. Group, in these embodiments, are analogous to component systems typically comprising a plurality of media devices. These groups can be readily added and removed from a zone.

Each media device maintains a "zone profile". This zone profile is typically in the form of a data file, which allows each device in the zone to know about each other device in the zone. This is updated regularly (for example, when a given device modifies its local data file, it communicates this modification to all other devices). If a device drops out of a zone for some reason (for example, if it falls out of range), it looks for the most recent zone profile of relevance (for example to find a similar zone). The zone profile, as described herein, includes aspects of information so that each media device knows the others supposed to be in the zone (member list), and those that are actually participating in the zone (connected list).

In an embodiment, a system wide heartbeat is implemented. If the zone controller is not receiving a heartbeat response from a particular zone member, it might adjust parameters to try and reach the that member, and then potentially determine (e.g. presumptively) that the member in question is no longer participating in the zone. Conversely, a device within a zone can remove itself from a zone if is does not receive sufficient heartbeat packets. This can assist in keeping a zone profile up to date.

In an embodiment, zone control can also provide credential management. A service like Rhapsody, which allows the streaming of tracks from a central server, typically does not allow simultaneous playing of the media on a plurality of devices. It would be appreciated the by using a zone it can be possible to provide the appearance that the media is playing on a single device. For example the media can initially be directed (of forwarded) to a zone controller.

In an embodiment, a zone can provide overall control, and group level control is retained for non-playback related functionalities (such as volume). For example, assume a zone is made up of speakers throughout a house, including several speakers in a particular room. Group level control can allow the adjustment of volume in that particular room without having to adjust the volume level elsewhere in the house. Such signals are provided to the constituent group controllers individually, rather than to the zone controller.

In an embodiment, the zone controller is responsible for distributing media to all individual physical devices (e.g. speakers) in the zone. Group controllers typically behave like slaves for playback commands and are treated no differently by the zone controller. That is, rather than a two-stage process whereby a command is propagated from a zone controller to a plurality of group controllers, and then by the plurality of group controllers to their respective physical devices, the zone controller provide instructions directly to the physical devices.

State data is maintained by each of group controller within a zone. By way of example only, the zone data can include the following:

| Variable Name | R/O | Data Type | Allowed Value |
|---|---|---|---|
| LastChange | R | string | CSV (string) |
| ZoneMemberList | R | string | CSV (string) |
| ZoneConnectedList | R | string | CSV (string) |
| ZoneStatus | R | string | "OK"/"FAILED" |
| ZoneMemberStatusList | R | string | CSV (string) |
| ZoneFriendlyName | R | string | String |
| ZoneVolume | R | ui2 | Min 0-Max 100 - Step 1 |
| ZoneMute | R | Boolean | |
| A_ARG_TYPE_ZoneUUID | R | string | String |
| A_ARG_TYPE_ZoneIPList | R | string | CSV (string) |
| A_ARG_TYPE_GroupIP | R | string | String |
| A_ARG_TYPE_ZoneMedia | R | string | "UNAVAILABLE" "COMPRESSED" "PCM" |

In this table: R=Required and O=Optional; and CSV stands for comma-separated value list. The type between brackets denotes the UPnP data type used for the elements inside the list. The CVS type is defined formally in the ContentDirectory service template.

The "LastChange" variable is used for eventing purposes to allow clients to receive meaningful event notifications whenever the state of the device changes. The LastChange state variable preferably identifies all of the state variables that have changed since the last time the LastChange state variable was evented. The following exemplary XML document illustrates a typical schema:

```
<Event xmlns="urn:schemas-avegasystems-com:metadata-1-0/AZCSDT/">
<ZoneFriendlyName val="ExampleZoneName"/>
<ZoneMemberList val="192.168.1.11,192.168.1.12"/>
<ZoneStatus val="NO_ZONE"/>
...
</Event>
```

The "ZoneMemberList" state variable is a comma-separated list (ie: CSV string) of IPv4 addresses of devices participating in the zone. This includes all devices configured to participate in the zone but not necessarily available (connected) or currently participating in any zone rendering activity. The first IP address in the list shall be the zone controller, although this device may not be the device streaming data from a media server. The number of devices which can be reported can be limited by the maximum string length <1024.

The "ZoneConnectedList" state variable is a comma separated list (i.e: CSV string) of IPv4 addresses of all the Aios devices actively participating in the zone. This list does not in anyway reflect the rendering state of the participating devices, only that they are connected and configured. The first IP address in the list shall be the zone controller. Note that this device may not be the device streaming data from a media server. The number of devices which can be reported is limited by the maximum string length of 1024 characters.

The "ZoneStatus" state variable is a string representing the overall status of the zone. Since many of the actions associated with maintaining a zone are blocking, this status state variable is intended to indicate to the control point the progress and result of zone actions. The ZoneStatus can be considered to represent the cumulative result of configuration activities.

The "ZoneMemberStatusList" state variable can be used to report the state of members within a zone. Takes the form of a comma-separated list (ie: CSV string) of the following format, where the first IP address and status in the list shall be the zone controller.

<Device IP>,<Status>,<Device IP>,<Status> . . . .

The "ZoneFriendlyName" state variable is intended to reflect the user defined zone friendly name. Where a zone is yet to be formed this shall be an empty string.

The "ZoneVolume" state variable is an unsigned integer variable that represents the current volume setting of the zone. Its value ranges from a minimum of 0 to a maximum of 100. A numerical change of 1 corresponds to the smallest incremental change that is supported by the device. It would be appreciated that, unlike the volume control found in the UPnP standard RenderingControl service, this control is intended to allow relative volume offsets to be calculated by slaves in a zone. Lower values will produce correspondingly quieter sound and higher values produce a louder sound. Given that this is an absolute value control, it is not possible to guarantee that the standard extremes of the control range can be reached over the entirety of the zone. So while a value of zero normally reflects mute state, not all nodes may have an absolute volume of this value.

The "ZoneMute" boolean state variable represents the current mute setting of the zone. A value of TRUE (for example a numerical value of 1) indicates that the output of the nodes in a zone is currently muted. It is not possible to specify a particular channel.

The "A_ARG_TYPE_ZoneUUID" state variable is used to pass the UUID of the zone being queried or configured. The UUID shall conform to the UDN requirements specified in a services template. A nil UUID shall indicate that a zone has not been configured by this device. Passing a nil UUID as an input argument to a "ZoneControl" action is typically deemed to be invalid.

The "A_ARG_TYPE_ZoneIPList" state variable is a comma separated list of IP addresses. The first IP address shall always be the zone controller. The string length is typically less than 1024 characters.

The "A_ARG_TYPE_GroupIP" state variable is a string representing a group. IP address.

In an embodiment, by way of example only, an Event Model is provided, as shown in the following table. While in this embodiment the ZoneService only exists as a single instance, in order to simplify event handling this service will adopt the same strategy to eventing as that found in the Event Model section of the RenderingControl service. The ZoneService can therefore defines a specialised state variable (LastChange) that is used exclusively for eventing individual state changes. In this model, the LastChange state change is the only variable that is evented using the standard UPnP event mechanism. All other state variables, are indirectly evented via the LastChange state variable. Note that A_ARG_TYPE_state variables are not evented, either directly or indirectly.

| Variable Name | Evented | Moderated Event |
| --- | --- | --- |
| LastChange | YES | YES |
| ZoneMemberList | NO | |
| ZoneConnectedList | NO | |
| ZoneStatus | NO | |
| ZoneMemberStatusList | NO | |
| ZoneFriendlyName | NO | |
| ZoneVolume | NO | |
| ZoneMute | NO | |
| A_ARG_TYPE_ZoneUUID | NO | |
| A_ARG_TYPE_ZoneIPList | NO | |
| A_ARG_TYPE_GroupIP | NO | |
| A_ARG_TYPE_ZoneMedia | NO | |

By way of example only, a number of actions are provided to support the establishing, maintenance and removal of zones. These actions include:

GetZoneMemberList, GetZoneConnectedList, GetZoneFriendlyName, SetZoneFriendlyName, GetZoneUUID, GetZoneStatus, GetMemberStatus, CreateZone, DestroyZone, AddMemberToZone, RemoveMemberFromZone, TestZoneConnectivity, GetZoneVolume, SetZoneVolume, GetZoneMute, and SetZoneMute/

The "GetZoneMemberList" action retrieves the current zone membership list.

The "GetZoneConnectedList" action retrieves the current zone membership list and consists of all devices currently available and under control of the zone controller.

The "GetZoneFriendlyName" action retrieves the current ZoneFriendlyName. Where the control point has not previously configured a zone friendly name the media device will return an empty string.

The "SetZoneFriendlyName" action configures the current ZoneFriendlyName. The zone friendly name is typically only retained for the lifetime of the zone.

The "GetZoneUUID" action allows a CP to obtain the "handle" of the zone configured on a media device. The originator of the zone should normally retain the UUID returned at the time of the zone creation. Only the lead group in a zone will be able to furnish the zone UUID of any previously created zone. A non-nil zone UUID indicates that the group is a zone controller.

The "GetZoneStatus" action provides a CP with ZoneStatus changes via the last change mechanism. Since some zone actions (particularly creation) can take a long period of time to complete, this action allows the CP to periodically poll the current zone status.

The "GetMemberStatus" action allows the CP to obtain the current status of all connected groups within a zone. This state information does not indicate the rendering state of the individual groups. This information should be retrieved via the mechanisms provided by the MediaRenderer services on the subservient groups.

The "DestroyZone" action is intended to provide a single action to take down a configured zone. Subservient nodes in the group will remain in zoned state until such time as the current URI is updated on the nodes.

The "GetZoneVolume" action retrieves the current value of the ZoneVolume state variable. The ZoneVolume contains a absolute value from zero to 100. Since the ZoneVolume control modifies the volume levels of slave (or group) nodes in a zone in a relative way, a current value of 100 does not necessarily mean that all nodes are at maximum volume.

The "SetZoneVolume" action, unlike the volume control found in the UPnP standard RenderingControl service, is intended to allow relative volume offsets to be calculated so providing relative control over slave nodes in a zone. The actual volume control range of a slave will be dependent on the relative initial volume settings of the slave renderer with respect to the zone lead. This means that it may not be possible to attain the theoretical maximum or minimum volume on slave devices. The other consequence is the relative volume difference may be negated once either extreme of the volume control is reached on both the zone lead and slave. The ZoneVolume is used to calculate a relative change to the local node absolute volume. The ZoneVolume does not correspond to a particular virtual renderer instance. It shall be assumed that modification of the ZoneVolume changes the RenderingControl volume with InstanceId=0 and Channel="Master".

The "GetZoneMute" action retrieves the current value of the ZoneMute state variable. A muted ZoneMute state does not necessarily mean that all nodes in a zone are muted since local group control is still possible.

The "SetZoneMute" action mutes all members within a zone. This action does not cause the corresponding device RenderingControl mute status to toggle rather it shall explicitly set the status to the desired value. In other words zone members already in mute state shall remain in mute state if mute is invoked. This action only changes the mute state of the renderer with InstanceID=0 and Channel="Master".

In an embodiment, multiple wireless audio systems are defined on a common network. For example, a building is split into areas where a different wireless audio system serves each area, although a single network serves all of the areas in combination. For example the three systems can be on the same wireless network.

In an embodiment, a networked digital media playback device advertises a standard digital media playback sub-device, which is discoverable and controllable by a standard control device in accordance with a standard media control protocol. The networked digital media playback device also advertises a non-standard digital media playback sub-device, the non-standard sub-device discoverable and controllable by a non-standard control device in accordance with a non-standard media control protocol. These two sub-devices can be manifested in the same device hardware, essentially allowing the device to implement dual-control such that it is able to operate both as a standard device and a non-standard device.

Some embodiments of the invention described herein are applicable to networked digital media playback devices. A network digital media playback device is a device that is capable of rendering digital media delivered to it via a computer network. In much of the description herein, wireless speakers are used as an example of networked digital media player. Those of ordinary skill in the art would readily be able to modify the description provided herein that is for wireless speakers and apply the methods and apparatuses to other discrete media playback devices. The description is provided in terms of wireless speakers in order to keep the description simple and not obscure various significant concepts.

Some embodiments of the invention described herein are applicable to networked digital media playback systems. A networked digital media playback system is a system that allows one or more devices connected via a computer network to render digital media. In much of the description herein, a wireless audio system is used as an example of a networked digital media playback system. Those of ordinary skill in the art would readily be able to modify the description provided herein that is for a wireless audio system and apply the methods and apparatuses to other digital media playback systems. The description is provided in terms of a wireless audio system in order to keep the description simple and not obscure various significant concepts.

The present embodiments typically operate in accordance with the UPnP protocol for advertisement, discovery and control actions. Moreover, the standard media control protocol is the Universal Plug and Play Audio and Video (UPnP AV) standard, provided by the Digital Living Network Alliance (DLNA). Details of this standard are available from www.dlna.org and www.upnp.org, and further context regarding the manner by which the standard device is configured for such compliance is provided further below. It would be appreciated that other standard may be substituted. It would be further understood that non-standard proprietary extensions to the general UPnP framework have be used in the present examples for providing Group Control, Zone Control, and Surround Sound. It would be appreciated that embodiments are applicable in the context of other such open connectivity protocols. For example, other known open connectivity protocols include Bonjour and Jini, as well as proprietary discovery protocols. Bonjour is a general method to discover services on a local area network, and is related to the Zeroconf specification framework. For Jini, see www.jini.org.

A wireless media system can, by way of example, include one or more wireless speaker subsystems. In a simple example, a wireless media system includes a group of wireless speaker subsystems arranged throughout a room, and configured to playback the same audio in synchronicity. In a more complex example each wireless speaker subsystem's playback is defined by a role for that wireless speaker subsystem—for example in the context of a stereo configuration, or a five-channel surround sound configuration, or some other surround sound configuration. In some embodiments a wireless audio system includes only a single wireless speaker subsystem.

Separate groups of media devices can also be unified into a single, autonomous "zone". Similar to a group of media devices, a zone of groups has its own control interface. This control interface is used to apply operational changes across the zone. That is, an operational change may be applied to the zone as a whole, and this change is subsequently implemented as appropriate by each of the individual groups of audio devices.

Although embodiments are described herein by reference to wireless speaker subsystems, it will be appreciated that in other embodiments other wireless media renderers are used. For example, wireless video units that receive over a wireless network data indicative of video and provide that video via a video output such as an LCD screen or an analogue or digital connection port.

Additionally, although the above embodiments have been described by reference to wireless networking, in some embodiments alternate networking arrangements are used such as wire-based Ethernet networks and power line networks. It will be appreciated that embodiments of the invention described by reference to wireless networking are equally applicable to these other networking arrangements.

It should be appreciated that although the invention has been described in the context of the IEEE 802.11 standard, the invention is not limited to such contexts and may be utilized in various other applications and systems, for example in other systems that use OFDM. OFDM is one example of a multicarrier system in which the signal for transmission is split into a set of subcarriers. The invention may also be applicable to other wireless receivers that use multicarriers.

Figure 9:
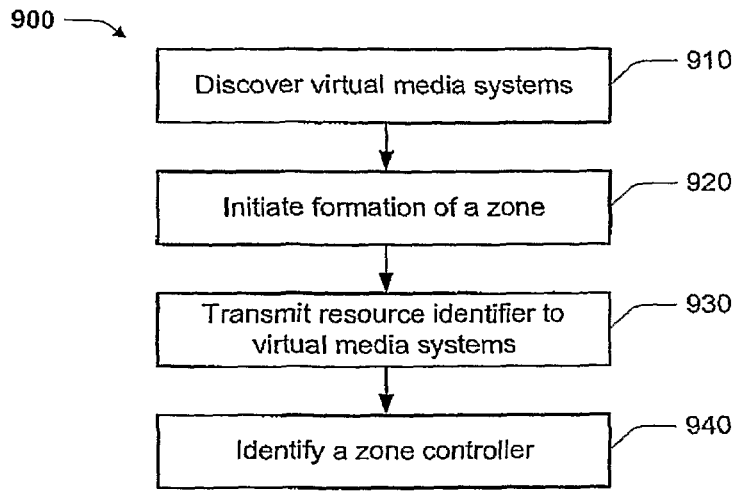
FIG. 9 shows an exemplary method for establishing a zone.

Referring to FIG. 9, by way of example only, a method 900 is shown for providing zone functionality to media sub-devices, wherein a plurality of virtual media systems are each configured to control a respective one or more media sub-devices, wherein each virtual media system is discoverable and controllable thereby to collectively control its respective one or more media sub-devices, wherein the media sub-devices are connected to a common data network. This method includes the steps of:
- (i) discovering the virtual media systems 910;
- (ii) initiating formation of a zone 920 including a selection of the virtual media systems;
- (iii) transmitting a single resource identifier 930 for the zone to each of the selection of virtual media systems; and
- (iv) identifying a zone controller 940, wherein the zone controller provides a virtual zone super-system that is discoverable and controllable thereby to collectively control the respective one or more media sub-devices of the selection of virtual media systems.

It would be appreciated that this method is typically performed by a control point.

Figure 10:
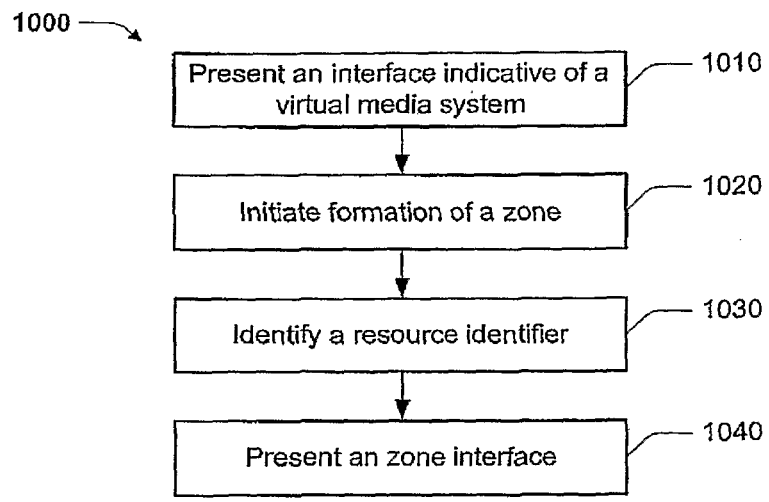
FIG. 10 shows an exemplary method for establishing a zone.

Referring to FIG. 10, by way of example only, a method 1000 is shown for providing zone functionality to media sub-devices, wherein a plurality of virtual media systems are each configured to control a respective one or more media sub-devices, wherein each virtual media system is discoverable and controllable thereby to collectively control its respective one or more media sub-devices, wherein the media sub-devices are connected to a common data network. This method includes the steps of:
- (i) presenting an interface indicative of a virtual media system 1010,
- (ii) initiating formation of a zone 1020;
- (iii) identifying a single resource identifier 1030 common to all selected virtual media system in a zone; and
- (iv) presenting an zone interface 1040 indicative of a virtual super-system for receiving a signal indicative of a zone function thereby to collectively control the respective one or more media sub-devices of the selection of virtual media systems.

It would be appreciated that this method is typically performed by a media sub-device configured to operate as a group controller and zone controller.

Figure 11:
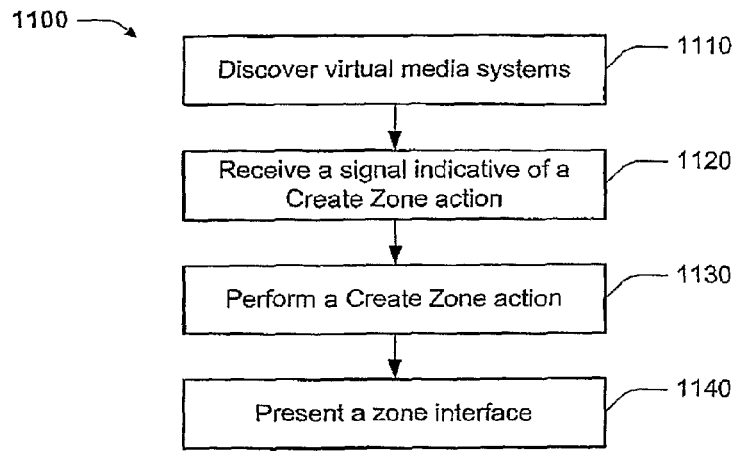
FIG. 11 shows an exemplary method for establishing a zone.

Referring to FIG. 11, by way of example only, a method 1100 is shown for providing zone functionality to media sub-devices, wherein a plurality of virtual media systems are each configured to control a respective one or more media sub-devices, wherein each virtual media system is discoverable and controllable thereby to collectively control its respective one or more media sub-devices, wherein the media sub-devices are connected to a common data network. This method includes the steps of:
- (i) discovering complimentary virtual media systems 1110;
- (ii) receiving a signal indicative of a Create Zone action 1120;
- (iii) performing a Create Zone action 1130 for establishing a zone that includes a selection of virtual media systems; and
- (iv) presenting a zone interface 1140 for provides a virtual zone super-system that is discoverable and controllable thereby to collectively control the respective one or more media sub-devices of the selection of virtual media systems.

It would be appreciated that this method is typically performed by a media sub-device configured to operate as a group controller and zone controller.

Figure 12:
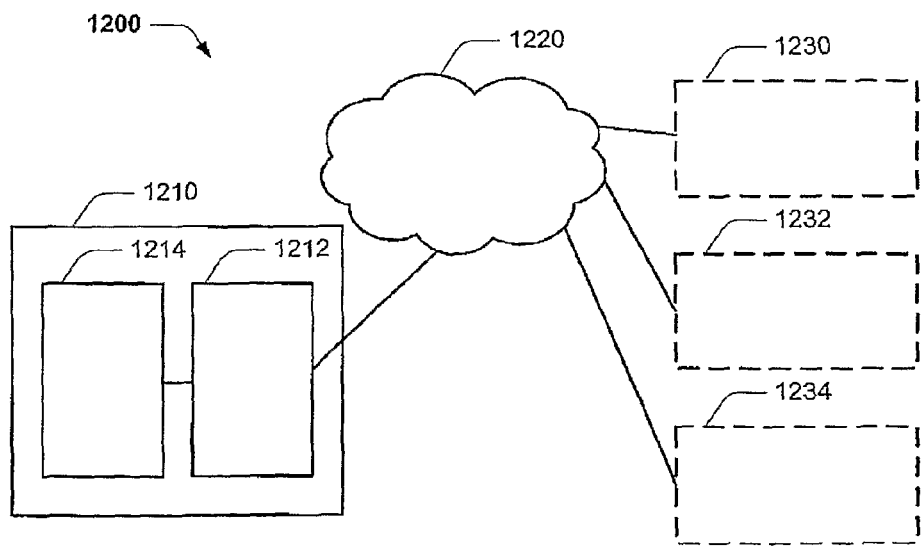
FIG. 12 shows an exemplary schematic for a zone controller coupled to a data network.

Referring to FIG. 12, by way of example only, a media playback apparatus 1210 includes:

a networking interface 1212 for connecting to a data network 1220; and a processor 1214 adapted to carry out a discovery process on the data network 1220 for allowing mutual discovery of complimentary virtual media systems (for example 1230, 1230, and 1230); processor further adapted to advertise a zone interface; processor further adapted to receive a signal indicative of a Create Zone action from the network interface; processor further adapted to perform the Create Zone action for establishing a zone that includes a plurality of the virtual media systems.

It would be appreciated that this method is typically performed by a media sub-device configured to operate as a group controller and zone controller.

In keeping with common industry terminology, the terms "base station", "access point", and "AP" may be used interchangeably herein to describe an electronic device that may communicate wirelessly and substantially simultaneously with multiple other electronic devices, while the terms "client", "mobile device" and "STA" may be used interchangeably to describe any of those multiple other electronic devices, which may have the capability to be moved and still communicate, though movement is not a requirement. However, the scope of the invention is not limited to devices that are labeled with those terms.

While an embodiment has been described for operation in an OFDM receiver with RF frequencies in the 5 GHz range and 2.4 GHz range (the 802.11a and 802.11g variants of the IEEE 802.11 standard), the invention may be embodied in receivers and transceivers operating in other RF frequency ranges. Furthermore, while a transceiver embodiment for operation conforming to the IEEE 802.11 OFDM standards has been described, the invention may be embodied in transceivers conforming to other standards and for other applications, including, for example other WLAN standards and other wireless standards. Applications that can be accommodated include IEEE 802.11a COFDM wireless LANs and links, wireless Ethernet, HIPERLAN 2, European Technical Standards Institute (ETSI) broadband radio access network (BRAN), and media mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing", "computing", "calculating", "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable medium encoded with computer-executable code.

Furthermore, a computer-readable medium may form, or be includes in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code; those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable medium encoded with a set of instructions, e.g., a computer program that are for execution on one or more processors, e.g., one or more processors that are part of a wireless speaker subsystem unit or other wireless media rendering device. Thus, as will be appreciated by those skilled in the art, embodiments of the present invention may be embodied as a method, an apparatus such as a special purpose apparatus, an apparatus such as a data processing system, or a computer-readable medium, e.g., a computer program product. The computer-readable medium carries, computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of computer-readable medium (e.g., a computer program product on a computer-readable storage medium) encoded with computer-readable program code embodied in the medium.

The software may further be transmitted or received over a network via a network interface device. While the computer-readable medium is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by one or more of the processors and that cause the one or more processors to perform any one or more of the methodologies of the present invention. A computer-readable medium may take many forms, including but not limited to, non-volatile media, volatile media, and transmission media. Non-volatile media includes, for, example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "computer-readable medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an exemplary of a means for carrying out the function performed by the element for the purpose of carrying out the invention.

In the description, provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

"Variants of the IEEE 802.11 standard" as used herein means the variants and proposed variants of the IEEE 802.11 standard. Variants are versions defined in clauses of the standard and proposed amendments of the standard.

It should be appreciated that although the invention has been described in the context of variants of the IEEE 802.11 standard, the invention is not limited to such contexts and may be utilized in various wireless and non-wireless network applications and systems.

In one embodiment the SPDIF enabled device becomes the controller. In some embodiments, the group and the media source will not be implicitly linked together, so it may be possible for one device to have the SPDIF input and another to provide the streaming source from SPDIF.

A networked digital media playback device may be connected through any form of computer network including networks with wired and wireless physical layers and networks consisting of multiple physical layers. The network through which the digital media playback device is connected does not affect the operation of the group other than to partially vary the extent to which synchronous playback is possible.

While in most of the description above, a set of wireless speakers is used as an example of a networked digital media player, the invention is not limited to wireless speakers. Those in the art would readily be able to modify the description provided herein for wireless speakers and apply the methods and apparatuses to other discrete media playback devices. Thus while in one embodiments, some of the media playback devices include a radio interface and the network includes a wireless network, in general, the invention is applicable to media playback devices that can connect to a computer network. The description is provided in terms of wireless speakers in order to keep the description simple and not obscure the inventive concepts.

Furthermore, in most of the description above, a wireless audio system is used as an example of a networked digital media playback system—i.e., as an example of a system that allows one or more devices connected via a computer network to render digital media, the invention is not limited to a wireless audio system. Those of ordinary skill in the art would readily be able to modify the description provided for wireless audio systems herein and apply the methods and apparatuses to other digital media playback systems. The description is provided in terms of wireless speakers and a wireless audio system in order to keep the description simple and not obscure the inventive concepts.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of providing zone functionality to media sub-devices the method including the steps of:
    (i) discovering a plurality of virtual media systems, wherein each virtual media system is configured to control a respective one or more media sub-devices, wherein at least one of the virtual media systems is configured to control a respective plurality of media sub-devices, wherein each virtual media system is discoverable and controllable thereby to collectively control its respective one or more media sub-devices, and wherein the media sub-devices are connected to a common data network;
    (ii) initiating formation of a zone including a selection of the virtual media systems;
    (iii) transmitting a single resource identifier for the zone to each of the selection of virtual media systems; and
    (iv) identifying a zone controller, wherein the zone controller provides a virtual zone super-system that is discoverable and controllable thereby to collectively control the respective one or more media sub-devices of the selection of virtual media systems;
    wherein, for media playback, the zone controller is responsible for distributing media data to all individual media sub-devices in the zone and wherein, during such playback, a given one of the virtual media systems is configured to implement a volume control command in respect of its respective one or more media sub-devices, wherein the volume control command is not implemented for any of the other media sub-devices, and wherein the volume control command is received by the given one of the virtual media systems from a control device without the volume control command being provided to the zone controller;
    wherein each individual media sub-device is configured to: maintain a zone profile data file; communicate updates to the zone profile data file to all other devices in the zone; and, in the case that the device temporarily drops out of the zone, identify a most recent zone profile data file thereby to rejoin the zone.

2. A method according to claim 1 wherein the zone controller is selected from the one or more media sub-devices of the selection of virtual media systems.

3. A method according to claim 1 wherein the resource identifier is a Uniform Resource Identifier.

4. A method according to claim 1 wherein the virtual media super-system is identifiable on the basis of a Universally Unique Identifier.

5. A method according to claim 1 wherein each virtual media system maintains a zone profile for maintaining data indicative of all virtual media systems in the zone.

6. A method according to claim 1 wherein each media sub-device maintains the zone profile data file for maintaining data indicative of all media sub-devices in the zone.

7. A method according to claim 6 wherein a first media sub-device retains the zone profile data file for allowing the first media sub-device to rejoin the zone if temporarily removed from the zone.

8. A method according to claim 6 wherein a first media sub-device retains the zone profile data file for allowing the first media sub-device to rejoin the zone after temporarily operating under local control.

9. A method according to claim 1 wherein each media sub-device monitors a heartbeat signal transmitted across the data network for maintaining connectivity to the zone.

10. A method according to claim 1 wherein the virtual zone super-system is controllable using zone interface adapted to receive a first signal indicative of a zone function and communicate a second signal indicative of the zone function to the selection of virtual media systems.

11. A method according to claim 1 wherein the virtual zone super-system is controllable using zone interface adapted to receive a first signal indicative of a zone function and communicate a second signal indicative of the zone function to the respective one or more media sub-devices of the selection of virtual media systems.

12. A method according to claim 11 wherein the fist signal is indicative of a relative volume adjustment for the respective one or more media sub-devices of the selection of virtual media systems.

13. A method according to claim 1 wherein the zone controller is adapted to act as a network proxy for receiving media data and transmitting corresponding media data to each virtual media systems in the zone.

14. A method according to claim 1 wherein the zone controller is adapted to act as a network proxy for receiving media data and transmitting corresponding media data to each media sub-device.

15. A method according to claim 1 wherein steps (i) through (iv) are initiated by a control point.

16. A method of providing zone functionality to media sub-devices, the method including the steps of:
    (i) presenting an interface indicative of a virtual media system,
    (ii) initiating formation of a zone, the zone being defined by a plurality of virtual media systems that are each configured to control a respective one or more media sub-devices, wherein at least one of the virtual media systems is configured to control a respective plurality of media sub-devices, wherein each virtual media system is discoverable and controllable thereby to collectively control its respective one or more media sub-devices;
    (iii) identifying a single resource identifier common to all selected virtual media systems in a zone; and
    (iv) presenting, via a zone controller, a zone interface indicative of a virtual super-system for receiving a signal indicative of a zone function thereby to collectively control the respective one or more media sub-devices of the selection of virtual media systems;
    wherein, for media playback, the zone controller is responsible for distributing media data to all individual media sub-devices in the zone and wherein, during such playback, a given one of the virtual media systems is configured to implement a volume control command in respect of its respective one or more media sub-devices, wherein the volume control command is not implemented for any of the other media sub-devices, and wherein the volume control command is received by the given one of the virtual media systems from a control device without the volume control command being provided to the zone controller;

wherein each individual media sub-device is configured to: maintain a zone profile data file; communicate updates to the zone profile data file to all other devices in the zone; and, in the case that the device temporarily drops out of the zone, identify a most recent zone profile data file thereby to rejoin the zone.

17. A method according to claim 16 wherein the virtual super-system is further adapted to receive a first signal indicative of a zone function provided to the zone interface and communicate a second signal indicative of the zone function to the respective one or more media sub-devices of the selection of virtual media systems.

18. A media playback apparatus including:
a networking interface for connecting to a data network; and
a processor adapted to carry out a discovery process on the data network for allowing mutual discovery of complimentary virtual media systems; processor further adapted to advertise a zone interface via a zone controller; processor further adapted to receive a signal indicative of a Create Zone action from the network interface; processor further adapted to perform the Create Zone action for establishing a zone that includes a plurality of the virtual media systems;
the zone being defined by a plurality of virtual media systems that are each configured to control a respective one or more media sub-devices, wherein at least one of the virtual media systems is configured to control a respective plurality of media sub-devices, wherein each virtual media system is discoverable and controllable thereby to collectively control its respective one or more media sub-devices;

wherein, for media playback, the zone controller is responsible for distributing media data to all individual media sub-devices in the zone and wherein, during such playback, a given one of the virtual media systems is configured to implement a volume control command in respect of its respective one or more media sub-devices, wherein the volume control command is not implemented for any of the other media sub-devices, and wherein the volume control command is received by the given one of the virtual media systems from a control device without the volume control command being provided to the zone controller;

wherein each individual media sub-device is configured to: maintain a zone profile data file; communicate updates to the zone profile data file to all other devices in the zone; and, in the case that the device temporarily drops out of the zone, identify a most recent zone profile data file thereby to rejoin the zone.

19. A media playback apparatus according to claim 18 wherein the processor is adapted to receive a first signal indicative of a zone function provided to the zone interface and communicate a second signal indicative of the zone function to the selection of virtual media systems.

20. A media playback apparatus according to claim 18 wherein the processor is adapted to receive a first signal indicative of a zone function provided to the zone interface and communicate a second signal indicative of the zone function to the respective one or more media sub-devices of the selection of virtual media systems.

* * * * *